United States Patent [19]

Jacobson

[11] Patent Number: 5,198,181
[45] Date of Patent: Mar. 30, 1993

[54] STABILIZING PLASMA IN THERMONUCLEAR FUSION REACTIONS USING RESONANT LOW LEVEL ELECTROMAGNETIC FIELDS

[76] Inventor: Jerry I. Jacobson, 153 Raintree Trail, Jupiter, Fla. 33458

[21] Appl. No.: 875,534

[22] Filed: Apr. 27, 1992

Related U.S. Application Data

[63] Continuation of Ser. No. 506,946, Apr. 9, 1990, abandoned.

[51] Int. Cl.$^5$ .............................................. G21B 1/00
[52] U.S. Cl. ................................................. 376/132
[58] Field of Search .............. 376/143, 132, 131, 124, 376/123, 121, 100

[56] References Cited

U.S. PATENT DOCUMENTS

| | | | |
|---|---|---|---|
| 3,967,215 | 6/1976 | Bellak | 376/150 |
| 4,047,068 | 9/1977 | Ress et al. | 376/128 |
| 4,330,864 | 5/1982 | Ohyabu | 376/133 |

OTHER PUBLICATIONS

Information Bulletin NT-8, May 1986, Princeton University Plasma Physics Laboratory.

*Primary Examiner*—Daniel D. Wasil
*Attorney, Agent, or Firm*—Quarles & Brady

[57] ABSTRACT

Particles including fusible nuclei and electrons are contained in a fusion reaction vessel having a conductive length. The particles individually have a mass and a velocity, and are resonated by a weak magnetic field applied to the vessel at a magnetic flux density set according to a relation equating the gravitational energy of the particles with the electromagnetic energy of the applied magnetic field. The magnetic field can be applied in addition to much stronger confinement and heating magnetic fields. The flux density B of the applied field is calculated according to the equation mc$^2$=Bvl coulomb, where m=the mass of a particle, c=the velocity of light, v=the mean orbital velocity of the earth about the sun, and l=the plasma circumference. At least two distinct particle masses are contained in the plasma, and distinct magnetic fields can be applied to the plasma at flux densities calculated according to said equation mc$^2$=Bvl coulomb for at least said two distinct masses. The field is applied using electromagnet coils substantially encompassing the plasma body, in particular by poloidal coils encompassing the toroidal confinement vessel of a Tokamak type reactor.

6 Claims, 2 Drawing Sheets

STABILIZING PLASMA IN THERMONUCLEAR FUSION REACTIONS USING RESONANT LOW LEVEL ELECTROMAGNETIC FIELDS

This is a continuation of application Ser. No. 506,946, filed Apr. 9, 1990, now abandoned.

BACKGROUND OF THE INVENTION

1. Field of the Invention

This invention relates to the field of plasma confinement in connection with thermonuclear fusion, and in particular to a method and apparatus for applying an electromagnetic field to a body of confined plasma, at a level calculated as a function of dimensional, mass and velocity parameters of the plasma body, using the relationship $mc^2 = Bvlq$, where "B" is the applied flux density, "m", "v", and "l" are the mass, velocity and length, respectively, of the plasma body or constituent thereof, and "c" and "q" represent constants, namely the speed of light and the quantum of charge.

By equating gravitational energy ($mc^2$) and electromagnetic energy ($Bvlq$), a resonance relationship is achieved that reduces lateral drift of ions and subatomic particles. Accordingly, confinement of the plasma is improved and the fusion reaction is more readily maintained within the Lawson criteria of minimum confinement time and maximum inter-particle spacing necessary to maintain the fusion reaction.

2. Prior Art

In high temperature nuclear fusion, for example to develop heat for the generation of electric power, particles of fusible nuclear material, i.e., the nuclei of lighter atoms, are combined to form heavier atoms, with a resulting release of energy. For example, deuterium or tritium atoms are fused to form helium atoms. The nuclei must be brought into proximity to fuse, against the forces normally tending to repulse them. According to conventional techniques, the particles are heated to high temperatures and impelled together, while attempting to confine the particles such that the energy released by fusion of nuclei will raise the energy of additional particles and produce a sustained reaction. High energy particles moving randomly in the plasma mass will come into proximity and fuse. The process relies both upon confinement of the nuclei and the high energy which impels them together.

The need to raise the energy of the particles is contrary to the need to confine them in close proximity. Lawson's criteria for sustaining a fusion reaction states that the numerical product of the particle density of a plasma (i.e., number of nuclei per cubic centimeter) and the particle confinement time (in seconds) must be greater than $6 \times 10^{13}$ cm$^{-3}$*sec to obtain a thermonuclear fusion reaction in deuterium and tritium. The sustained temperature required in the plasma to obtain a break-even level of energy extracted vs. auxiliary heating energy input is believed to be 100 million °C. The Princeton Plasma Physics Laboratory has obtained the Lawson density-time relationship as well as the break-even temperature in separate experiments using the Tokamak Fusion Test Reactor. However, plasma confinement remains a problem.

The Tokamak has a toroidal vacuum vessel for confining the plasma. Vacuum pumps can reduce the pressure therein to a level on the order of $10^{-1}$ to $10^{-8}$ Torr (about 1/100 billionth of an atmosphere). The strongest magnetic field components are toroidal field coils operable to produce a toroidal magnetic field up to 52 kilogauss for confining the plasma. Twenty toroidal field coils are operated at $3.2 \times 10^6$ ampere turns to obtain the toroidal field, which can be sustained for about three seconds, and can be repeated every five minutes.

A poloidal field coil system comprises four groups of windings located outside the toroidal field coils and parallel to the plasma. Ohmic heating coils are disposed in the central hole of the toroidal vacuum vessel and the current therein is varied to induce a current in the plasma. The current provides heating and improves the stability of plasma confinement. A current level variation of 50,000 amperes in the ohmic heating coils produces a 2.5 million ampere plasma current. Equilibrium field coils are provided to position the plasma within the vacuum vessel. One function of the equilibrium field coils is to provide plasma compression by moving the plasma radially inwardly to a region of higher toroidal magnetic field. This compression increases the plasma density and pressure. Variable curvature coils are used to adjust the curvature of the equilibrium field lines. Horizontal field coils position the plasma vertically. The object of the overall coil arrangement is to heat and compress the plasma. However, with heating and with collisions, the nuclei of the atoms in the plasma are energized to move randomly, such that the required density and confinement time requirements are difficult to maintain at and above the break-even temperature.

According to the present invention, a mechanism is provided by which to prevent lateral ionic drift of ions and electrons in a plasma confinement apparatus, such as the Tokamak. Additional toroidal, poloidal and solenoidal coils are utilized for the production of relatively very-weak magnetic fields on the order of magnitude 10-10 gauss to 10-21 gauss. The specific level depends upon the dimensions (e.g., circumference) of the toroidal magnetic confinement chamber. The weak added field is applied at a level calculated according to the fundamental resonance relationship $mc^2 = Bvl$ coulomb. The added weak field induces a reorientation of the internal crystalline state of the ponderable bodies within the plasma (nuclei, electrons and other subatomic particles including neutrinos), whereby said ponderable bodies are better maintained within the fundamental body of the plasma so as to propitiate ignition of said plasma and to maintain the appropriate temperatures in hundreds of millions of degrees Kelvin to propagate controlled thermonuclear fusion power for commercial purposes.

The theoretical basis of said maintenance of ions, electrons and neutrinos within the body of the plasma includes four fundamental quantum phenomena: the piezoelectric effect, quantum Hall effects, cyclotron resonance effect and magnetic resonance to be summed up by the unified field equation $mc^2 = Bvl$ coulomb. These aspects of the invention are discussed herein in detail.

The proposition that a fusion process, which relies on magnetic induction on the kilogauss level to induce currents of millions of amps, could be favorably affected by a supplemental field of $10^{-10}$ gauss or less, relies on a consideration of gauge theory. It is well understood that electric charges, moving charges (i.e., current) and magnetic fields interact and according to Maxwell's laws propagate electromagnetic fields in space. It is also understood that physical reactions are in part governed by the electromagnetic forces that together with other forces (e.g., gravity, as well as strong and weak nuclear forces) produce attractions and repulsions of particles at various levels. The electromagnetic field incident on a particular ponderable body such as a particle or a body of plasma includes components of a multiplicity of electromagnetic interactions all concurrently operating.

According to the method of viewing and modeling the effects of electromagnetic fields known as gauge theory, all electromagnetic interactions are considered to operate instantaneously and independently. Although the level of an electromagnetic field produced by a given source may be small in comparison to the level of fields applied by other sources, every field has an effect which can be considered apart from the effects resulting from other sources. The fields due to sources other than a particular source under consideration can be ignored according to this analysis as they represent a background or ambient condition. The differential effect due to a particular source under consideration can thus be analyzed for its differential effects on the target. As an extremely simple example, one can accurately measure a microamp of current induced in a conductor loop due to passage through a low level magnetic field even though the same conductor may be subject to other magnetic fields and other influences which affect the conductor as well as the base level from which the measurement is taken. Electromagnetic effects are thus analyzed as differential effects.

Numerous physical measurements and calculations from measurements have been made to determine the physical characteristics of particles involved in physical reactions. However, the prior art has not successfully applied an analysis of differential effects of electromagnetic fields under gauge theory to the physical characteristics of the particles and/or body of plasma involved in particular reactions such as thermonuclear fusion. According to the invention, a resonant electromagnetic field applicable to a particle is determined by equating the characteristic energy of a particular particle based on its mass (energy = $mc^2$) to the electromagnetic energy of an applied field in a conductor of the relevant length and velocity (energy = $Bvl$ coulomb). The required flux density B can be applied at a frequency which likewise is calculated as a function of the physical characteristics of the target body. The result is a resonant field tending to agitate and thereby alter the mobility of the target particles, with concomitant effects on the reactions between particles.

The energy of an electromagnetic field calculated according to the invention can be small in comparison to other effects, for example the toroidal field of the Tokamak. However, the effects of the field are nevertheless real and subject to measurement or calculation according to gauge theory.

SUMMARY OF THE INVENTION

It is an object of the invention to eliminate lateral ionic drift in fusion apparatus such as characterized by the Tokamak Test Fusion Reactor, therein maintaining the plasma temperature to fulfill the Lawson criterion and propitiate ignition.

It is also an object of the invention to employ the fundamental resonant relationship of gravitational energy and electromagnetic energy to influence the mobility of particles and bodies of plasma containing the particles.

These and other objects are achieved by a method and apparatus for resonating particles including fusible nuclei and electrons contained in a fusion reaction vessel having a conductive length l, the particles individually having a mass m, and a velocity v, are resonated by a weak magnetic field applied to the vessel at a magnetic flux density set according to a relation equating the gravitational energy of the particles with the electromagnetic energy of the applied magnetic field. The magnetic field can be applied in addition to much stronger confinement and heating magnetic fields. The flux density B of the applied field is calculated according to the equation $mc^2 = Bvl$ coulomb, where m = said mass, c = the velocity of light, v = said velocity of the particle and l = said length. At least two distinct particle masses are contained in the plasma, and distinct magnetic fields can be applied to the plasma at flux densities calculated according to said equation $mc^2 = Bvl$ coulomb for at least said two distinct masses. The field is applied using electromagnet coils substantially encompassing the plasma body, in particular by poloidal coils encompassing the toroidal confinement vessel of a Tokamak type reactor.

BRIEF DESCRIPTION OF THE DRAWINGS

There are shown in the drawings the embodiments of the invention as presently preferred. It should be understood that the invention is not limited to the precise arrangements and instrumentalities depicted, and is subject to some variation within the scope of the present disclosure and claims. In the drawings.

DETAILED DESCRIPTION OF THE PREFERRED EMBODIMENTS

Figure 1:
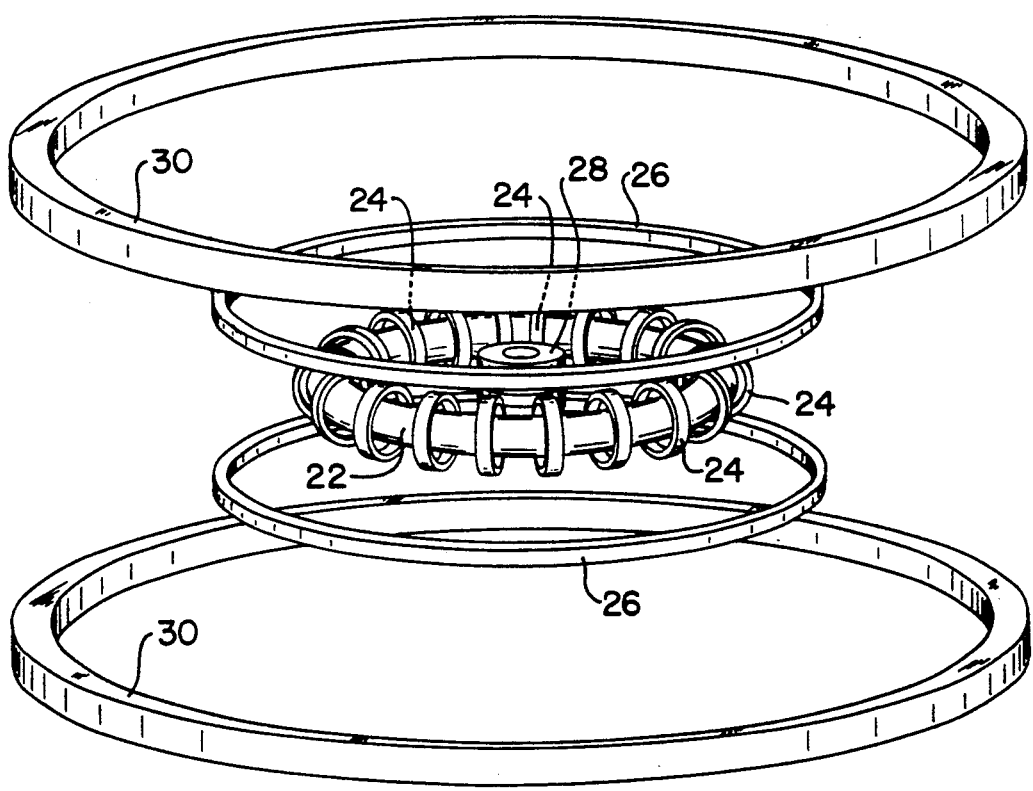
FIG. 1 is a perspective view of a toroidal fusion reactor vessel including supplemental poloidal field coils according to the invention.

Lateral ionic drifts occur when a discontinuity develops in the body of the plasma as a result of quantum asymmetrical interactions. Quantum asymmetries are amplified to produce a bending of the body of the plasma. The result is crowding of magnetic lines of flux on one side of the plasma which tends to push the plasma toward the wall of the container and effectively lower the temperature and confinement density. The quantum asymmetries are in fact the result of internal structural irregularities within the fabric of the ponderable bodies comprising the plasma, namely the nuclei, electrons, etc. The objective then is to reorient the crystalline lattices of those of the nuclei and electrons which are inappropriate for the production of thermonuclear power in that they are subject to quantum asymmetrical interaction with other particles. This is accomplished by application of an electromagnetic field at a flux density B calculated according to the relationship $mc^2 = Bvlq$, where "m", "v", and "l" are the mass, velocity and length, respectively, of the plasma body or constituent thereof, and "c" and "q" represent constants, namely the speed of light and the quantum of charge.

According to the invention, at least one supplemental field at the required flux density to resonate with at least one form of particle in the plasma, for example deuterium nuclei, is applied to the plasma body by means of a large poloidal coil forming a solenoid of sufficient dimensions to substantially apply the supplemental field to the whole of the fusion apparatus. The flux density applied via the supplemental coil is relatively low in power as compared to the driving fields applied to the plasma in order to confine and heat it. The supplemental field can alternatively or additionally be applied by toroidal field coils, the supplemental field in each case being incident on the body of plasma and all the ponderable bodies therein.

The invention relies in part on a relationship of gravitational energy (mc²) and electromagnetic energy (Bvlq). This relationship concerns the fundamental nature of particles and fields. Various persons have searched for a unified field theory which would link the physics of particles with the physics of space. The hallmark of Newtonian particle theory was force at a distance. However, this did not suit Einstein because he felt that forces at a distance could not fully describe the raw experience of daily life. Material events occur not by actions-at-a-distance but by contact. Einstein, therefore, felt that the best scientific theory is a field theory. Nevertheless, neither special nor general relativity eliminated the disturbing dualism between particle and field. It was therefore natural for Einstein, after general relativity, to attempt to create a unified field theory which could describe the electromagnetic and gravitational fields, from which particles would emerge as knots in space-time. Additionally, the electro-weak and electro-strong nuclear forces would be manifestations of the electromagnetic force. Threefold unification includes the electromagnetic, the weak and the strong nuclear forces. Fourfold unification would include gravity, the elasticity of space-time requiring that events which occur by contact may indeed produce mechanical vibrations of the electromagnetic field from electromagnetic oscillations by deformation of the gravitational field.

According to the invention, gravitational and electromagnetic potential are set in dual resonance by the equation mc² = Bvl coulomb.

$$\sigma = Bvl, \text{ and} \tag{1}$$

$$E/q = \sigma. \tag{2}$$

Therefore, $$E = Bvlq. \tag{3}$$

Also, $$E = mc^2. \tag{4}$$

Thus, E/c² is a mass point or ponderable body of field; "B" is magnetic flux; "v" is velocity, namely the relative electron and earth's orbital velocity; "l" is the length of the pertinent conductor; "E" is the magnetic field energy; "$\sigma$" is induced electromagnetic field strength; "q" is the electric charge; and, "c" the velocity of light.

From equations (3.) and (4.), we get $$mc^2 = Bvlq \text{ Where "q" represents a single coulomb.} \tag{5}$$

Equation (5.) is essentially the equation of cyclotron resonance, when the velocity limit maximum of a subject accelerated ion is equal to c. Thus, all point masses are considered to possess magnetic moments which relate to the total field as ponderable charged domains of matter. Therefore, all "strings" are inherently interfaces or edges of energy domains as well as components of domains. Magnetic resonance interactions and the piezoelectric effect point to the relation of the mechanical to the field in all matters, substantiated by infrared emissions from materials subjected to electromagnetic radiation.

$$v/r = B(q/m) = \omega \tag{6}$$

$$B = mv/qr \tag{7}$$

From equation (5.), we have $$B = \frac{mc^2}{vlq} \tag{8.}$$

Combining equations (7.) and (8.), we get $$\frac{mv}{qr} = \frac{mc^2}{vlq}, \tag{9.}$$

(wherein r = 1, to be explained in a later section).

$$mv^2 = mc^2. \tag{10.}$$

mc² = Bvlq shows the relation of inertial frames in equivalence as waves of fields are correlated in resonant systems of energy interactions corresponding to gravitational masses of discrete ponderable bodies of relative quantum character. Vibrating strings creating oscillations of electromagnetic fields in a much larger string, a line conductor of length l, will resonate with a system composed of quantum character (and mass m) having internal strings of total gravitational energy mc². mass m is in each case connected to a system of particular stiffness within the conductor (l) so the electromagnetic vibrations of interaction (Bvlq) correspond with the natural resonant frequency of mass m, inducing internal vibration in mass m.

An analysis of the units of measure according to equation (5.) as to a quantum, one coulomb charge is as follows, letting mc²=Bvl*(l):

$$B = m/qt \tag{11.}$$

$$\text{gauss} = \frac{\text{maxwell}}{\text{cm}^2} = \frac{\text{dyne}}{\text{amp*cm}} \tag{12.}$$

$$\text{gauss} = \frac{\frac{g*cm}{\text{sec}^2}}{\frac{\text{coulomb*cm}}{\text{sec}}} \tag{13.}$$

Derived from equations (12.) and (13.):

$$\text{gauss} = \frac{g}{\text{coulomb*sec}} \tag{14.}$$

The foregoing equations can be considered in discussion of Jacobson resonance (according to the invention), cyclotron resonance and Zeeman resonance. In accordance with classical mechanics and the special theory of relativity, space-time has an existence independent of matter or field. In order to describe at all that which fills or occupies space and interacts in dependence upon relative coordinates therein, space-time or the inertial system with its metrical properties must be thought of as existing to begin with, otherwise the description of "that which fills up space" has no meaning. On the basis of the general theory of relativity, on the other hand, it is space as opposed to "what fills space" which is affected in a manner relating to the coordinates of masses. Space has no separate existence. Thus a pure gravitational field might have been described in terms of the $g_{ik}$ (i.e., as a function of coordinates) by solution of the gravitational equations. The functions $g_{ik}$ describe not only the field, but at the same time also the topological and metrical structural properties of the manifold. Then it follows, there is no such thing as an empty space; i.e , a space without field. Space-time does not claim existence on its own, but only as a structural quality of the field.

Thus, according to Einstein, Descartes was not far from the truth when he believed he must exclude the existence of an empty space. The notion appeared to Einstein as absurd, so long as physical reality is seen exclusively in ponderable bodies. It requires the idea of the field as the representative of reality, in combination with the general principle of relativity, to show the true kernel of Descartes idea: there it exists no space "empty of field".

$mc^2 = Bvl$ coulomb describes the mathematical relation of quantum mechanics to general relativity in terms manifest by the concrete physical reality of gravitational point masses and vibrating string or wave segments of spatial line extensions; i.e., wavelength as given by $\lambda = h/mv$, comprised by reference points. DeBroglie waves or waves of probability describe a set of waves that represent the behavior under appropriate conditions of a particle, e.g., its diffraction by a crystal lattice. In Zeeman and cyclotron resonance, a wave is considered a disturbance traveling through a medium by virtue of elastic and inertial factors of the medium being relatively small and returning to zero.

When the disturbance has passed $\lambda$ represents the distance in a wavetrain between a vibrating particle and the nearest one vibrating in the same phase. In Jacobson resonance, "l" represents summation of all the distances between vibrating ponderable bodies, i.e., the total length of a system under consideration as does "q" represent the summation of all the charges that experience a force from the total energy resulting from the electromagnetic field interaction when there occurs unification of gravity and electromagnetic potential. Thus, in this context, $\lambda = l$ (length) and $q = 1$ (unity). This includes four-dimensional space delineated by a total field incorporating gravitational points or ponderable bodies generating all action-at-a-distance by way of string. Two postulates are essential features of this equivalence of gravitational and electromagnetic interaction energies in dual resonance:

(a) All spontaneous interactions are independent. Inertial systems are independent in terms of ponderable bodies but dependent upon the hitherto "undetected" aether. The foregoing explains the reason for the absence of electromagnetic fields in the pure gravitational equations. Gravity is based upon an inertial system independent of electromagnetic fields and dependent upon the ponderable bodies comprising the gravitational field.

(b) Gravitational energy is outside matter because it is contained within the abstract point masses formulating the fabric of the metric of space-time itself. The gravitational energy is hidden in the abstract points creating this elemental structure of the pure spatial metric according to $E = mc^2$.

In considering the fundamental equation of magnetic resonance, we write the expression E = the $g_e$ factor * the Bohr magneton * the flux density * c. When the electronic g factor = 2 and the Bohr magneton = $(qh)/(4 pimc)$, we look for the equivalence of the expression $(g_e * \beta_e * B * c) = Bclq$. In this manner, we shall determine that the cyclotron resonance equation and the fundamental equation of magnetic resonance are precisely the same as the general unified field equation, $mc^2 = Bvl$ coulomb, when vmax = c, and r = 1.

We note DeBroglie said, when v = c $$l = \lambda = h/mc, \lambda \text{ being distance.} \quad (15)$$

The Bohr magneton is the equal to $$\frac{qh}{4pimc} = \frac{q*1}{2} \quad (16.)$$

Thus, $$g_e * \beta_e * B * c = g_e * BcLq/2 = E = mc^2 \quad (17)$$

The adjustment for the 2 in the denominator is made in Zeeman resonance by the electronic g factor. Note $g_e = 2.002322$. Therein, the electronic g factor is equal to 2 and adjusts the magnetic resonance equation so that it is an expression equal to Bclq which is equal to energy. In accordance with the understanding that the symbol v is equal to c, with respect to the Lorentz transformation relative to the coordinate system of the perceiver, we see that in the equation of Zeeman resonance c is a constant which connotes an inertial velocity utilized in all calculations, precisely as the orbital earth velocity is used for our current purposes in all calculations for the general unified field equation, $mc^2 = Bvl$ coulomb. In considering the $E = g_e * \beta_e * B * c$ (equation (17.)), we see that we may write $$E = mc2 = 2*qmc^{2*}(t/4pimc)*B*c. \quad (18)$$

Dividing both sides by $mc^2$ and by t, we get the expression $$\frac{1}{t} = \frac{qB}{2\pi m} = f. \quad (19.)$$

This is precisely the expression for cyclotron resonance.

Furthermore, in accordance with equation (6.), we may write the expression for cyclotron resonance as $v/r = qB/m$. When r = 1, $$mv = rqB = lqB. \quad (20)$$

Dividing both sides by t, $$mv/t = vqB = F. \quad (21)$$

Multiplying both sides by l, $$F*l = W = E = Bvlq \quad (22)$$

Thus, as a general expression for the equation for cyclotron resonance, we may write $mc^2 = Bvlq$. However, when dealing with the equation for cyclotron resonance in a more specific manner, we may let v = c and write $$c/r = qB/m \quad (23)$$

Therefore, $$mc = qBr \quad (24)$$

Again, r=1, and $$mc = qBl \quad (25)$$

Multiplying both sides by c, results in equation (17.), namely $mc^2 = Bclq$, the same expression that we obtained from the fundamental equation for magnetic resonance when the upper velocity limit of the accelerated ion equals c. We note that when $mv^2 = mc^2$, we may write $m_1v^2 = m_2c^2$ and $m_1$ is greater than $m_2$. In a more general unified field equation $mc^2 = Bvl$ coulomb, where m is a quantum mass contained within a string of length l, and q=unity as a result of a single coulomb being a fundamental resonant harmonic of charge.

Be definition, a volt=energy per unit charge or E/q. Therefore, we may write $E = Bvlq$, while q=1, maintaining the integrity of q as a fundamental unit of charge. Therefore we may write the expression: total energy, expressed as E, is equal to $Bvlq$. Integrity of the units is seen as we reiterate the following:

$$\frac{m * distance^2}{t^2} = \frac{m}{coulomb * t} \times \frac{distance}{t} * distance * coulomb.$$

An important consideration is the nonarbitrariness of the magnitude of a single coulomb. If the magnitude of a single coulomb is an arbitrary choice, then the foregoing would be erroneous. On the other hand, if the magnitude of a single unit of charge designated by definition to be a coulomb, is a nonarbitrary choice and indeed a fundamental harmonic of charge in resonance with varying charge harmonics, then the foregoing is absolutely correct. In this manner, the general unified field equation eliminates the necessity to delineate the particular charge of the mass given on the left side of the equation to be therein contained within the string line conductor 1 undergoing the electromagnetic interaction. This means that when the q in the general expression $mc^2 = Bvl$ coulomb is a single coulomb, resonant vibration of field induced within the string line conductor via the electromagnetic interaction will fundamentally jiggle masses which are resonant energy domains to the total energy production of the electromagnetic interaction. Within a plasma system, the framework designates that nuclei and electrons will be the fundamental mass units to be mechanically vibrated by electromagnetic interactions with very weak magnetic fields. The weak fields are an adjuvant to the strong magnetic fields necessarily employed.

It is possible to consider variation of the g factor and r=1. Zeeman resonance and cyclotron resonance are equivalent to Jacobson resonance when vmax=c and r=1. It must be particularly noted that the general expression $mc^2 = Bvl$ coulomb describes a system wherein the g factor is electronic, i.e., $g_e = 2$. This distinction may be explained with the utilization of string theory. In string theory, the manifestation of a particle depends upon its internal state of vibration and its linear extension in space-time. Although the linear extension refers also to curvilinear or geodetic lines, the perception of a straight line is fundamentally relativistic. More specifically, the arc of a semicircle is a string with total length approximately 6.28 or pi*r, when r=2. When the string is closed into a full loop, the diameter is 2. The radius of the arc of the semicircle having a length 6.28 is 2, wherein the diameter of the closed loop is equal to 2. Thus r=1, 1 being the extension seen cross-sectionally in two dimensions. The diameter of the open arc of 6.28 is equal to 4. The electronic g factor describes a string which is manifested as an electron point mass when the loop is closed. The nuclear g factor describes a string manifested as a proton as the string is open into the arc of the semicircle, and as this arc is further extended linearly, a perceiver looking at the string from a two dimensional planar angle cross-sectionally sees a string approximately 5.6. This is because the arc string is open somewhat in between a totally extended linear state and the fundamental state of a semicircular arc wherein the diameter would be 4. Thus string theory explains the necessity for the variation of the electronic g factor to the nuclear g factor, i.e., the same string manifesting itself as two different fundamental particles, dependent upon the extension in space-time regulated by the internal state of vibration.

The interstitial hidden string is a propitiator of the fusion reaction. The abstract reference points which create the metric of space-time are closed in General Relativity to the electromagnetic field, in fact to all matter. Yet we have seen those abstract points actually contain gravitational energy, and maintain in independent inertial system while taking part in the construction of the reality of the field itself. This paradoxical situation presented by nature may only be explained with hidden string, a connection of the substance of the field to the substance of that entity which is apparently ultimate to the field in quantum character. The question of the aether returns to haunt physics as we maintain our search of the connecting matter between the mass points that comprise string, and the connections between gauge particles. The question of the kinetic aether and relative closure of the universe then rests entirely upon the existence of hidden string.

Repeating equation (5.), $mc^2 = Bvlq$, and equation (11.), which is derived from (5.), $B = m/qt$, $$\frac{1 \text{ weber}}{m^2} = \frac{10^4 \text{ maxwells}}{cm^2} = \frac{1 \text{ newton}}{amp * m} \quad (26.)$$

$$10^4 \text{ gauss} = \frac{\frac{Kg * m}{sec^2}}{\frac{coul * m}{sec}} \quad (27.)$$

Derived from the physical definitions (12.) and (13.), $$10^4 \text{ gauss} = Kg/(coul * sec). \quad (28)$$

A single coulomb of charge contains:

$$6.25 \times 10^{18} e^{-} * 9.11 \times 10^{-28} g = 5.7 \times 10^{-9} \text{ grams of matter.} \quad (29)$$

$$\text{one gauss} = 1.75 \times 10^7 \, g/sec. \quad (30)$$

Most particularly, a single maxwell, the magnetic line of force, carries approximately:

$$1.75 \times 10^7 \, g * cm^2 * s^{-1}. \quad (31)$$

Indeed, the single magnetic line of force, in a vacuum, carries about seventeen-and-a-half million grams of matter every second through a square centimeter of extension. Cross sectionally the plane is infinitesimally narrow as string. It is lucid that a kinetic aether of variance in dimensional quality must serve as our unseen source of hidden string. Therefore, every abstract reference point comprising the essential fabric of the metric of space-time is itself an intrinsic Galilean coordinate system.

The foregoing considerations have practical application with respect to plasma confinement. The gravitational aether is only discoverable in terms of the potential to predict phenomena resulting from interactions which may be supposed to influence the aether and thereby to subsequently or concomitantly influence the relations of the electromagnetic field. Plasma physics presents the opportunity to examine the natural theory and number symmetry correlations, to verify that the kinetic aether (1) does really exist and (2) is not absolutely inertially independent but is relativistically so.

With reference to FIG. 1, the Tokamak magnetic confinement apparatus, engages hot plasma gas of fusible fuel, i.e., deuterium and tritium. Fusion reactors of this type have thus far produced temperatures as high as 300 million degrees Kelvin for periods of up to a few seconds. Although the temperature is high enough, the time during which the necessary temperature and confinement may be maintained is inadequate for ignition of the plasma and the resultant Q greater than the 20, which is fairly typical of such a system. In a Tokamak which is the size of an auditorium, only about 2 grams of deuterium-tritium fuel are set to vaporize in a vacuum. Space-time within the framework of the toroidal magnetic confinement apparatus is crystallized in very regular patterns, in terms of the abstract points which make up the metric of intrinsic quality of space-time itself. Viewed from the perspective of this realm there is indeed little material comprising the electromagnetic field of the magnetic chamber. The rapidity of motion of the fusible material increases as the temperature increases. As the kinetic energy of the nuclei increases to above 100,000 electron volts something critical occurs. The criticality of the occurrence must be dependent upon the fact that the mechanistic structure of the electromagnetic field comprising the matter in the chamber creates not just lines of electrons, and discontinuities in said lines (popping out quasi-particles), but it in fact must squeeze the relativistic magnetic monopole intrinsic to the gravitational field outside the matter therein. A chain reaction ensues to move real ponderable bodies, however virtual and ghostlike they may be from the gravitational aether, to the electromagnetic field and vice versa, in perfectly symmetrical fashion. Thus we may create on a substructured level only with very weak magnetic fields as a quantum gravity, the equalization of material tension body of the aether. This kinetic, virtual interchange of gauge particles is the principal propitiator of ignition of controlled thermonuclear fusion. The regulator of the crystalline structure of the electromagnetic field itself is principally the quantum Hall effect and the relatives thereof, i.e., the cyclotron resonance effect, magnetic resonance and the piezoelectric effect.

According to the invention, magnetic fields are set up wherein the toroidal magnetic confinement system is placed in a plane at right angles to the magnetic lines of force. A transverse Lorentz force is produced and is adjustable with variation in the field strength. The open circuit created in a transverse direction to the substantial plane of the toroidal confinement chamber and at right angles to extra poloidal electromagnets (set in resonance with nuclei and electrons), adjusts conditions in a homeostatic manner. This means that the internal gravitational strings of electrons and nuclei of a plasma will be virtually adjustable wherein the greater lateral movement of the particles to lower the plasma temperature by colliding with the walls of the container will be avoidable. Substantially, the electrons and nuclei that would have been lost to system without the extra poloidal weak intensity magnetic fields may be contained by the framework of the conductive mode of the body of the plasma, fundamentally necessary to establish and meet the Lawson criterion for particle density and confinement time.

A Tokamak according to the invention, as shown in FIG. 1, has a toroidal confinement chamber 22, with a plurality of toroidal field coils 24. Poloidal coils 26 and ohmic heating coils 28 are included. However, in addition to these elements as required for basically confining and heating the plasma, the invention employs supplemental field generating coils 30. In the embodiment shown, two coils 30 defining produce supplemental fields at right angles to the plane of the toroidal confinement chamber 22, the coils 30 having an internal span or lumen sufficient to substantially encompass the toroidal vessel. The coils 30 are energized to provide weak magnetic fields at levels as calculated hereinafter, such that the additional electromagnetic fields produced by the supplemental poloidal coils 30 set the reactor in dual resonance with the gravitational energies of the electrons and nuclei which otherwise would have been lost to the system and uncontrollable.

$$mc^2 = Bvl \text{ coulomb} = 3.3475 \times 10^{-24} \text{ g} * 9 \times 10^{20} \text{ cm}^2/\text{s}^2 = \quad (32.)$$
$$\text{(deuteron mass)}$$

$$B * 2.93 \times 10^6 \text{ cm/s}^* \quad 3.11 \times 10^3 \text{ cm } * \text{ coulomb.}$$
$$\text{(earth's mean} \quad \text{(approximate plasma}$$
$$\text{orbital velocity)} \quad \text{circumference in Tokamak)}$$

$$B = \frac{30.12575 \times 10^{-4} \frac{g * cm^2}{s2}}{9.1123 \times 10^9 \frac{cm^2 * coulomb}{sec}} = \frac{g}{coulomb*sec} \quad (33.)$$

$$= 3.306 \times 10^{-13} \text{ gauss.}$$

This flux density B is obtained at the toroidal confinement vessel by means of one of the poloidal magnet coils 30. This supplemental field of the poloidal coils is set in resonance with deuterons. The Tokamak Fusion Test Reactor (TFTR) at Princeton has demonstrated an energy confinement time (r) of 0.4 sec at a peak electron density (n) of $1 \times 10^{14}$ cm$^{-3}$, for an n r of $4 \times 10^{13}$ cm cm$^{-3}$ sec at a temperature of 2.2 KeV, using deuterium pellet injection. Deriving B from mc$^2$=Bvl coulomb, using an approximation for the plasma circumference, shows nearly the same number with exponential reciprocal as n r experimentally derived.

$$mc^2 = Bvl \text{ coulomb} \quad (34)$$

$$\underbrace{9.11 \times 10^{-28} \text{ g}}_{(e^- \text{ mass})} * \underbrace{9 \times 10^{20} \text{ cm}^2/s^2}_{(c^2)} = \quad (35.)$$

$$B * 2.93 \times 10^6 \text{ cm}/s * 3.11 \times 10^3 \text{ cm} * \text{coulomb}.$$
$$\quad (\text{earth's } v) \quad\quad (\text{plasma circumference})$$

$$B = \frac{81.99 \times 10^{-8} \frac{\text{g}*\text{cm}^2}{s^2}}{9.1123 \times 10^9 \frac{\text{cm}^2}{s} * \text{coulomb}} \quad (36.)$$

$$= 9 \times 10^{-17} \text{ gauss}.$$

The second poloidal stabilizing magnet is energized at this level, namely the level required for tuning to electrons. The flux density in accordance with the dimensions of the reactor as indicated is $9 \times 10^{-17}$ gauss. The n λ for particles which are electrons must of course be reciprocally greater as indicated.

$$mc^2 = Bvl \text{ coulomb} = \underbrace{3.3475 \times 10^{-24} \text{ g}}_{(\text{deuteron mass})} * \underbrace{9 \times 10^{20} \text{ cm}^2/s^2}_{(c^2)} = \quad (37.)$$

$$\underbrace{10^{-14}}_{\substack{(\text{reciprocal of} \\ \text{Lawson criteria}) \\ \text{Lawson criterion}}} * 2.93 \times 10^6 \text{ cm}/s \times \underbrace{\text{``}x\text{'' cm} * \text{coulomb}}_{\substack{(\text{more} \\ \text{appropriate} \\ \text{plasma circumference})}}$$

$$\text{``}x\text{'' cm} = \frac{30.12575 \times 10^{-4} \frac{\text{g}*\text{cm}^2}{s^2}}{2.93 \times 10^{-8} \frac{\text{cm}}{s} * \text{coulomb}} \quad (38.)$$

$$= 1.03 \times 10^5 \text{ cm} = 3{,}300 \text{ feet}.$$

This length of $1.03 \times 10^5$ cm is a more appropriate circumference for the plasma, to prevent loss of temperature from lateral particle drift.

Figure 2:
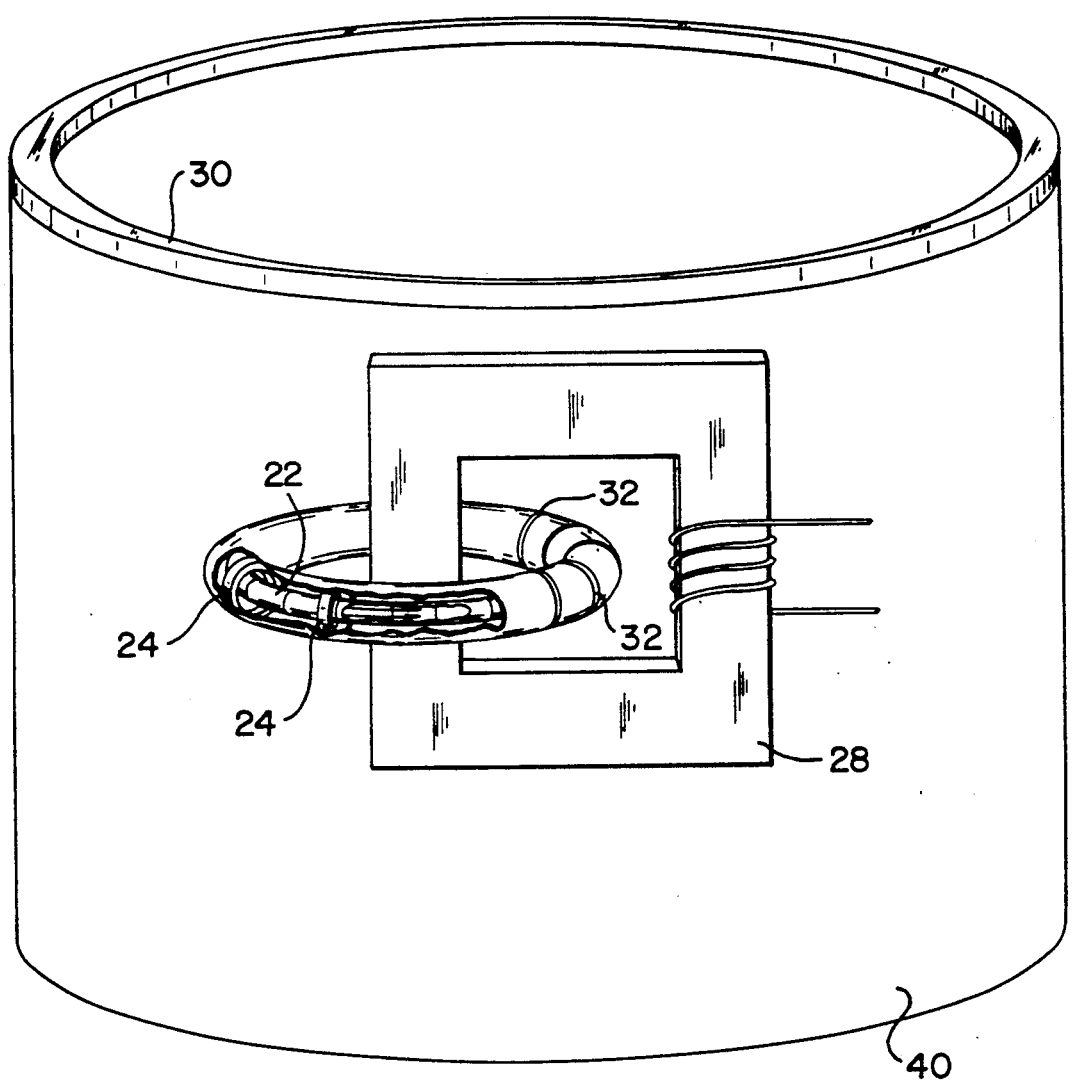
FIG. 2 is a schematic representation of the invention, wherein the supplemental field coils include poloidal and toroidal field coils, the poloidal field coils being generally illustrated as a large solenoid encompassing the fusion reactor in the lumen of the solenoid.

The application of the field according to the preferred embodiment of the invention requires two additional poloidal magnetic coils 30, as indicated in FIG. 1, namely one for the deuterium nuclei and one for the electrons in the plasma. It is also possible to arrange supplemental toroidal coils 32, as shown in FIG. 2, to supplement the magnetic confinement and heating fields with tuned fields at a level calculated as disclosed herein to establish dual resonance of the electromagnetic and gravitational energies of the relevant particles.

The very weak magnetic field associated with the deuteron mass is the steady magnetic field associated with the gyromagnetic ratio of the electron in the cyclotron resonance formula:

$$f_c = qB/2m, \quad (39)$$

when $f_c$ is the frequency of fluctuation of the field of the sun.

The supplemental field coil can be operated with a relatively larger number of turns and relatively lower voltage or a relatively lower number of turns and higher voltage, the objective being simply to provide a supplemental field at the noted flux density. The supplemental coils can be made of a semiconductor material such as germanium or silicon.

FIG. 2 illustrates an embodiment wherein one secondary poloidal coil 30 is provided. The secondary coil defines a large solenoid 40, of sufficient dimensions to substantially encompass the fusion reactor. This secondary coil is operated to produce a magnetic flux density in the area of the plasma confinement vessel according to the relationship $mc^2 = Bvl$ coulomb, where the mass m is the mass of a particle in the plasma, particularly deuterium or tritium nuclei. The supplemental toroidal coils 32 can be tuned to one particle mass and the poloidal coil 30 to another particle mass.

The invention having been disclosed, additional variations will become apparent to persons skilled in the art and aware of this disclosure. Reference should be made to the appended claims rather than the foregoing specification as indicating the true scope of the invention in which exclusive rights are claimed.

I claim:

1. In a thermonuclear fusion reactor of the type which heats a plasma and confines the plasma in a substantially toroidal shaped volume disposed in a plane, the improvement comprising:

conductive coils disposed adjacent said plasma and being shaped to produce a magnetic field which passes through said plasma when a current is applied thereto; and means for applying a current to said conductive coils such that the flux density (B) of their magnetic field as it passes through the plasma is less than $10^{-10}$ gauss and satisfies the equation $m_1 c^2 = Bvl$ coulomb, where $m_1$ is the mass of a particle in the plasma, c is the velocity of light, v is the mean orbital velocity of the earth about the sun, and l is the circumference of the toroidal shaped plasma.

2. The thermonuclear fusion reactor as recited in claim 1 which includes second conductive coils disposed adjacent said plasma and being shaped to produce a magnetic field which passes through said plasma when current is applied thereto, and second means for applying a current to said second conductive coils such that the flux density (B) of the magnetic field produced by said second conductive coils as it passes through said plasma is less than $10^{-10}$ gauss and satisfies the equation $m_2 c^2 = Bvl$ coulomb, where $m_2$ is the mass of a second particle in the plasma.

3. The thermonuclear fusion reactor as recited in claim 1 in which said conductive coils are poloidal coils.

4. The thermonuclear fusion reactor as recited in claim 2 in which said conductive coils are poloidal coils disposed to one side of said toroidal plasma and said second conductive coils are poloidal coils disposed to the other side of said toroidal plasma.

5. The thermonuclear fusion reactor as recited in claim 1 in which the magnetic field produced by the conductive coils passes through the plasma substantially perpendicular to said plane.

6. The thermonuclear fusion reactor as recited in claim 2 in which the magnetic fields produced by the conductive coils and the second conductive coils pass through said plasma substantially perpendicular to said plane.

* * * * *